United States Patent
Cochran et al.

(10) Patent No.: US 11,167,434 B2
(45) Date of Patent: Nov. 9, 2021

(54) ROBOTIC PROCESSING SYSTEM

(71) Applicant: HIGHRES BIOSOLUTIONS, INC., Beverly, MA (US)

(72) Inventors: Nigel Cochran, Medford, MA (US); Ulysses Gilchrist, Reading, MA (US); Blaine Stevenson, Woburn, MA (US); Paul Harper, Shropshire (GB)

(73) Assignee: HIGHRES BIOSOLUTIONS, INC., Beverly, MA (US)

( * ) Notice: Subject to any disclaimer, the term of this patent is extended or adjusted under 35 U.S.C. 154(b) by 1040 days.

(21) Appl. No.: 15/689,986

(22) Filed: Aug. 29, 2017

(65) Prior Publication Data

US 2018/0056528 A1 Mar. 1, 2018

Related U.S. Application Data

(60) Provisional application No. 62/381,400, filed on Aug. 30, 2016.

(51) Int. Cl.
*B25J 15/04* (2006.01)
*B25J 19/06* (2006.01)
*B25J 15/02* (2006.01)

(52) U.S. Cl.
CPC ............. *B25J 19/063* (2013.01); *B25J 15/02* (2013.01); *B25J 15/0441* (2013.01); *B25J 19/065* (2013.01); *Y10S 901/49* (2013.01)

(58) Field of Classification Search
CPC .... B25J 15/04; B25J 15/0408; B25J 15/0441; B25J 19/063
See application file for complete search history.

(56) References Cited

U.S. PATENT DOCUMENTS

| | | | | |
|---|---|---|---|---|
| 4,673,329 A | * | 6/1987 | Kato | B25J 19/063 414/744.5 |
| 4,725,190 A | | 2/1988 | Kato | |
| 4,789,769 A | * | 12/1988 | Warner | B23K 11/31 219/119 |

(Continued)

FOREIGN PATENT DOCUMENTS

JP 0911169 1/1997

OTHER PUBLICATIONS

International Search Report, International Application No. PCT/US2017/049455, dated Dec. 1, 2017.

*Primary Examiner* — Michael P Ferguson
(74) *Attorney, Agent, or Firm* — Perman & Green, LLP

(57) ABSTRACT

A robotic transport system including a drive section connected to a frame, an articulated arm operably coupled to the drive section providing the articulated arm with arm motion in at least one axis of motion moving at least a portion of the articulated arm in a collaborative space, corresponding to the frame, from a first location to another different location in the collaborative space, the articulated arm having an end effector with a workpiece grip having workpiece engagement members engaging and holding a workpiece during workpiece transport, by the arm motion in the at least one axis of motion, wherein at least one of the workpiece engagement members is frangible compliant, having a frangible compliant coupling between a distal portion of the at least one of the workpiece engagement members and a base portion of the end effector from which the at least one of the workpiece engagement members depends.

10 Claims, 11 Drawing Sheets

(56) References Cited

U.S. PATENT DOCUMENTS

| | | | |
|---|---|---|---|
| 5,040,915 A | | 8/1991 | Stuart et al. |
| 5,484,219 A | | 1/1996 | Drew et al. |
| 5,697,480 A | * | 12/1997 | Herbermann .......... B25J 19/063 |
| | | | 192/150 |
| 5,947,539 A | | 9/1999 | Long et al. |
| 7,560,071 B2 | | 7/2009 | Nichols et al. |
| 8,734,720 B2 | | 5/2014 | Nichols et al. |
| 8,795,593 B2 | | 8/2014 | Nichols et al. |
| 9,623,405 B2 | | 4/2017 | Nichols et al. |
| 10,082,631 B2 | * | 9/2018 | Lee ...................... G02B 6/3886 |
| 10,335,958 B2 | * | 7/2019 | Kerestes .............. B25J 15/0441 |
| 10,414,055 B2 | * | 9/2019 | Kerestes .............. B25J 15/0491 |
| 2011/0270445 A1 | | 11/2011 | Nichols et al. |
| 2013/0292958 A1 | | 11/2013 | Bucknell |
| 2013/0341944 A1 | | 12/2013 | Schlaich et al. |
| 2014/0132020 A1 | | 5/2014 | Claffee et al. |
| 2017/0120454 A1 | * | 5/2017 | Ferguson ............. B25J 19/0045 |

\* cited by examiner

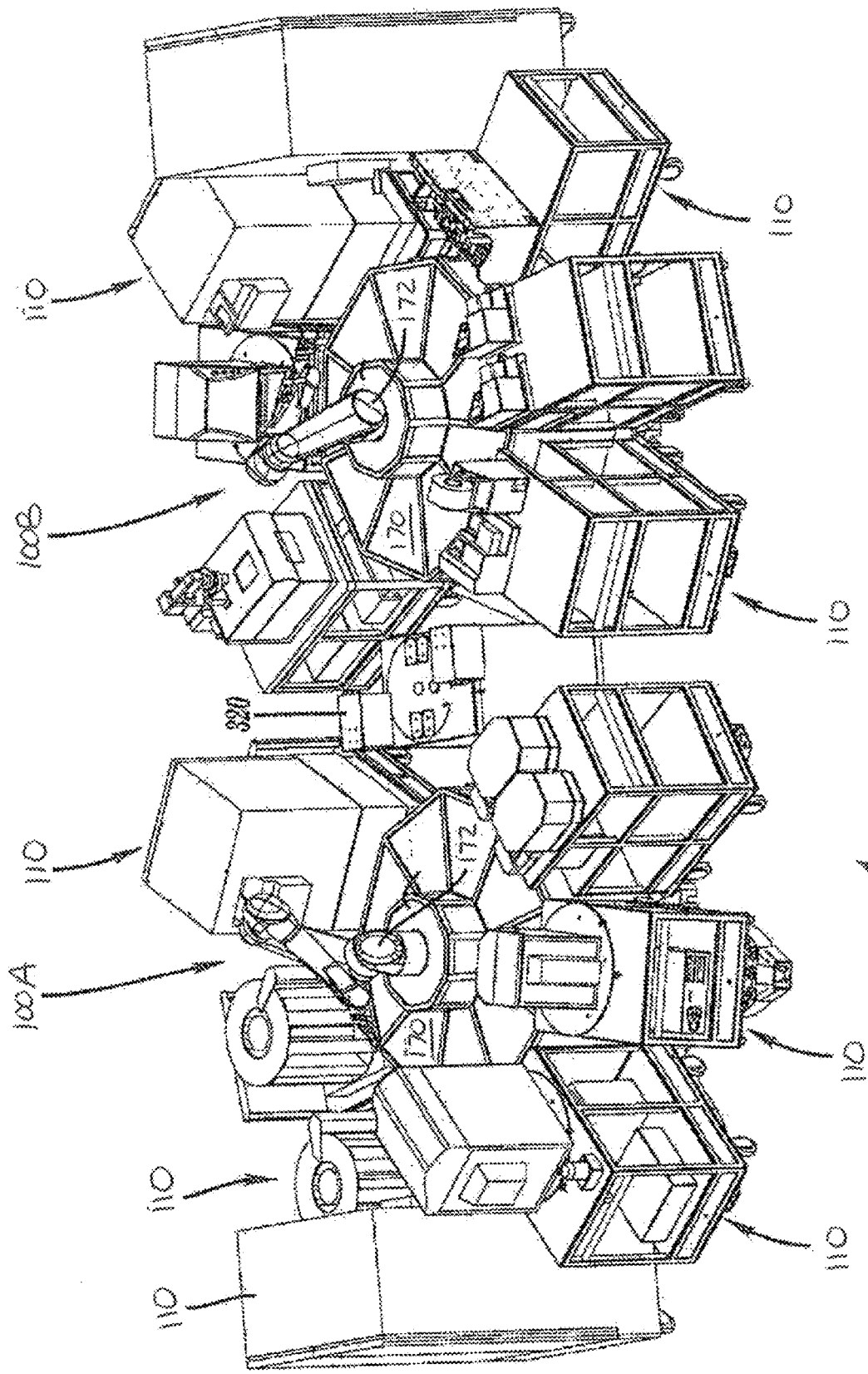

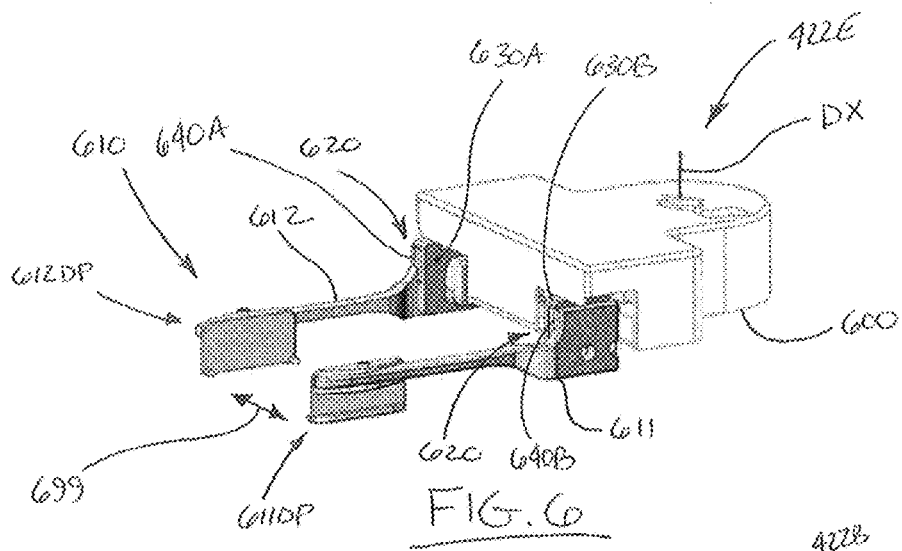
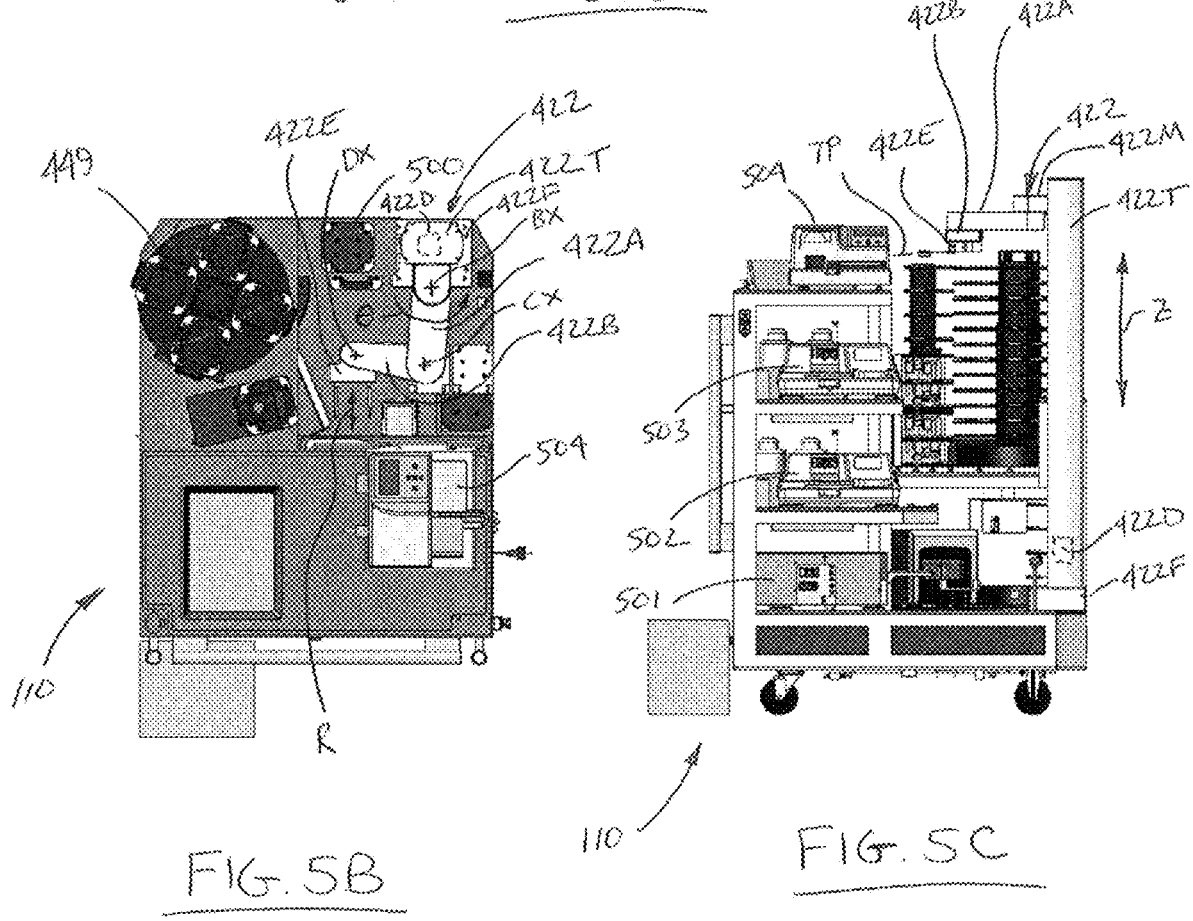

ROBOTIC PROCESSING SYSTEM

CROSS-REFERENCE TO RELATED APPLICATIONS

This application is a non-provisional of and claims the benefit of U.S. Provisional Patent Application No. 62/381,400 filed on Aug. 30, 2016, the disclosure of which is incorporated herein by reference in its entirety.

BACKGROUND

1. Field

The exemplary embodiments generally relate to robotic systems, and more particularly, to robotic systems having end effectors for transporting items.

2. Brief Description of Related Developments

In robotic processing systems the end effector of the transport robot may be the most delicate and specialized part of the robotic system. For example, the end effector may include specialized griping members configured to grip any suitable item/workpiece having a predetermined shape where contact between the end effector and the item occurs at predetermined areas of the item. Generally at least a portion of the end effector that interfaces with the item is a rigid member that exerts a predetermined amount of force on the item to effect gripping of the item with the end effector. In some instances there may be an unexpected change in the environment in which the transport robot operates. For example, an object may be unintentionally located within the operating space of the transport robot where, damage to the end effector and/or the object may result if contact is made between the end effector and the object.

In one aspect, compliant robotic arms that have break away features may help mitigate the risk of damage to the end effector and/or object however, the compliant robotic arms are still capable of exerting excessive force with their end effectors. For example, conventional complaint robotic arms allow for parts of the robot arm to break away, but only over a limited distance. In other examples some parts of the conventional robotic arms may be spring loaded however; once the preload of the spring is overcome the spring exerts increasing force rather than a decreasing force. The limited movement of the breakaway features and the increasing spring force may cause damage to the robotic arm and the object unintentionally contacted by the robotic arm.

In other aspects, sensors may be placed on the end effector or at other suitable locations on the transport robot that are configured to sense obstacles in the transport robot path and/or excessive current being drawn by the transport robot drive system, which may indicate contact with the unintended object. Light curtains or other proximity sensor may also be placed in and/or around the robotic processing system so that the robotic processing system is shut down (ceases operation) when the light curtain or other proximity sensor detects an unintended object. The addition of object detection sensors in the robotic processing system may undesirably increase the complexity and cost of the robotic processing system.

BRIEF DESCRIPTION OF THE DRAWINGS

The foregoing aspects and other features of the disclosed embodiment are explained in the following description, taken in connection with the accompanying drawings, wherein:

FIG. 2 is a schematic illustration of a robotic processing system in accordance with one or more aspects of the disclosed embodiment;

FIGS. 5A, 5B and 5C are schematic illustrations of a portion of a robotic processing system in accordance with one or more aspects of the disclosed embodiment;

FIG. 6 is a schematic illustration of a robotic processing system in accordance with one or more aspects of the disclosed embodiment;

DETAILED DESCRIPTION

The aspects of the disclosed embodiment described herein address the problems of conventional robotic processing systems, as noted herein, by providing a robotic processing system that includes at least one end effector that has frangible compliant workpiece engagement members that detach from the end effector when a predetermined force is exerted on the workpiece engagement members. The aspects of the disclosed embodiment also provide for "snap on" type reattachment of the workpiece engagement members on the end effector at a predetermined operating location, relative to a predetermined reference datum of the robotic transport arm, after unintended contact with an object OBJ1-OBJ5 (see FIGS. 10A and 10B) so that re-teaching/re-calibrating of the robotic transport is unnecessary and where the object OBJ1-OBJ5 and the robotic processing system are located in a collaborative operating space SPC (see FIGS. 1A-3). As such, the aspects of the disclosed embodiment may eliminate the need for object detection and/or proximity sensors within the robotic processing system. The aspects of the disclosed embodiment may also prevent distortion and/or damage to the end effector, the transport robot, the workpiece/item carried by the robotic transport and/or an object OBJ1-OBJ5 that is unintentionally located within the collaborative operating space SPC of the robotic transport.

Figure 1A:
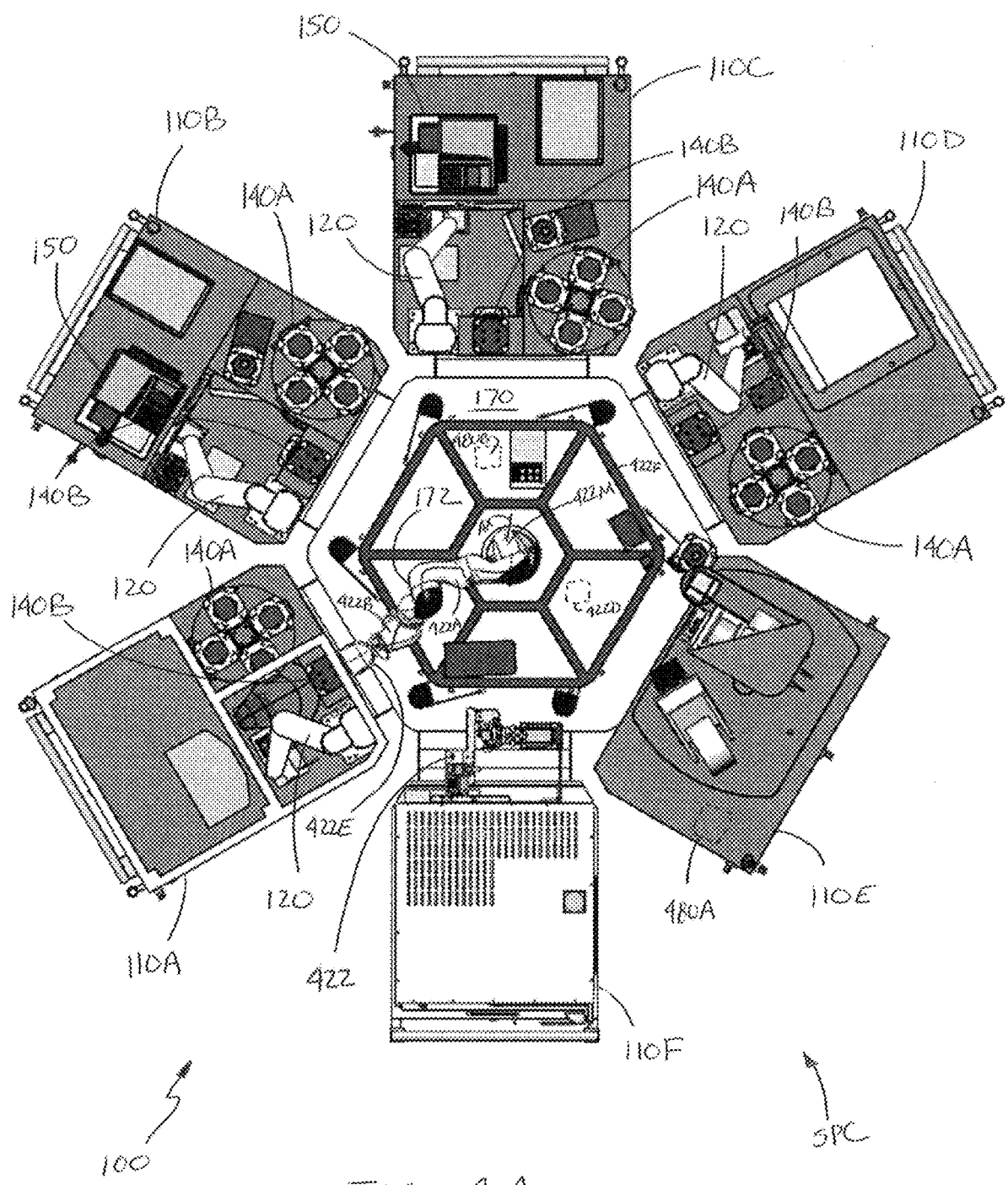
FIGS. 1A and 1B are schematic illustrations of a robotic processing system in accordance with one or more aspects of the disclosed embodiment.
Figure 1B:
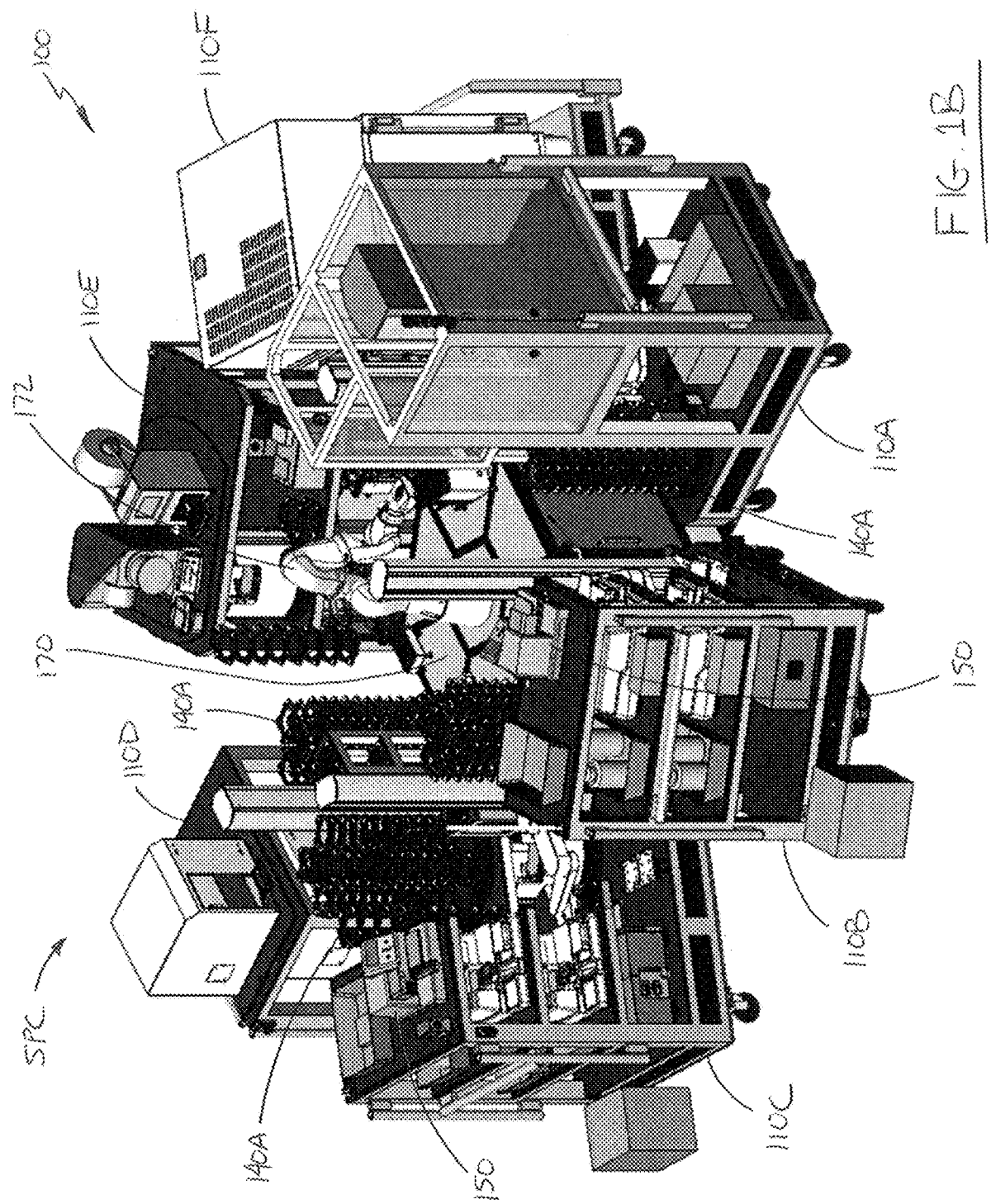

FIGS. 1A and 1B illustrate a robotic processing system 100 in accordance with one or more aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Referring to FIGS. 1A and 1B, in one aspect, the robotic processing system 100 includes a collaborative operating space SPC in which one or more mobile carts 110A-110F of the robotic processing system 100 are located. The robotic processing system 100 may also include an automated system 170, disposed in the collaborative operating space SPC, to which the one or more mobile carts 110A-110F are operably interfaced. Each of the mobile carts 110A-110F may include one or more of a robotic transport arm 120, 422, one or more workpiece holding stations 140A, 140B, an operator interface 150 and any other suitable instrumentation, processing and/or storage equipment suitable for interfacing with the workpiece(s) handled by the robotic processing system 100. As may be realized, a user or operator may access one or more regions of the collaborative operating space SPC (e.g. interface 150, one or more holding stations 140A, 140B, or other location on mobile carts 110) directly, and at times such access may be coincident or coexistent with robotic transport arm 120, 172, 422 operation within the collaborative operating space SPC. For example, an operator may place or pick a workpiece on or from a holding station 140A, 140B in anticipation of a robotic pick of that workpiece as an aspect of a collaborative action with the robotic transport arm 120, 422, 172. Accordingly the robotic transport arm 120, 422, 172 and operator collaborate in the collaborative operating space SPC in some aspects as will be described further below. In one aspect, each of the mobile carts 110A-110F includes one or more datum surfaces or features that are in a known spatial relationship with a sensor (or other detectable feature) of a respective mobile cart 110A-110F. In one aspect, the features (such as robotic transport arms, workpiece holding stations and any other instrumentation/equipment) of each mobile cart 110A-110F are in a known relationship with the one or more datum surfaces or features where the robotic processing system 100 may include a device or tool for sending a signal indicating the position of the mobile cart features to the automated system 170 as described in, for example, United States Patent Publication No. 2011/0270445 A1, the disclosure of which is incorporated herein in its entirety.

In one aspect, the automated system 170 includes any suitable robotic transport arm 172 for accessing one or more features of the one or more mobile carts 110A-110F. In one aspect, the robotic transport arm may be a selective compliant articulated robot arm (SCARA arm) or any other arm suitable for transporting workpieces in the collaborative space SPC. For example, the robotic transport arm 172 may be configured to access the workpiece holding stations 140A, 140B, interface with the robotic transport arms 120, 422 or interface/access any other suitable instrumentation/processing equipment of the one or more mobile carts 110A-110F as described in United States Patent Publication No. 2011/0270445 A1, previously incorporated herein by reference. In one aspect, the automated system 170 is configured as a cluster tool and has a hexagonal configuration where six mobile carts are operably interfaced with six facets of the automated system 170. In other aspects, the automated system 170 may have any number of facets (e.g. pentagonal, octagonal, rectangular, etc.) so that any suitable number of mobile carts 110A-110F may be interfaced with the automated system 170.

Referring to FIG. 2, in one aspect, two or more robotic processing systems 100A, 100B may be operably coupled to each other in any suitable manner as described in U.S. Pat. Nos. 7,560,071, 8,734,720, and 8,795,593, the disclosures of which are incorporated herein by reference in their entireties. The robotic processing systems 100A, 100B may be substantially similar to robotic processing system 100 described above where each of the robotic processing systems 100A, 100B includes an automated system 170 and any suitable number of mobile carts 110. Here, any suitable interface station 320 operably couples the robotic processing systems 100A, 100B to each other so that workpieces may be transferred from one robotic processing system 100A, 100B to the other robotic processing system 100A, 100B through the interface station 320 in any suitable manner.

Figure 3:
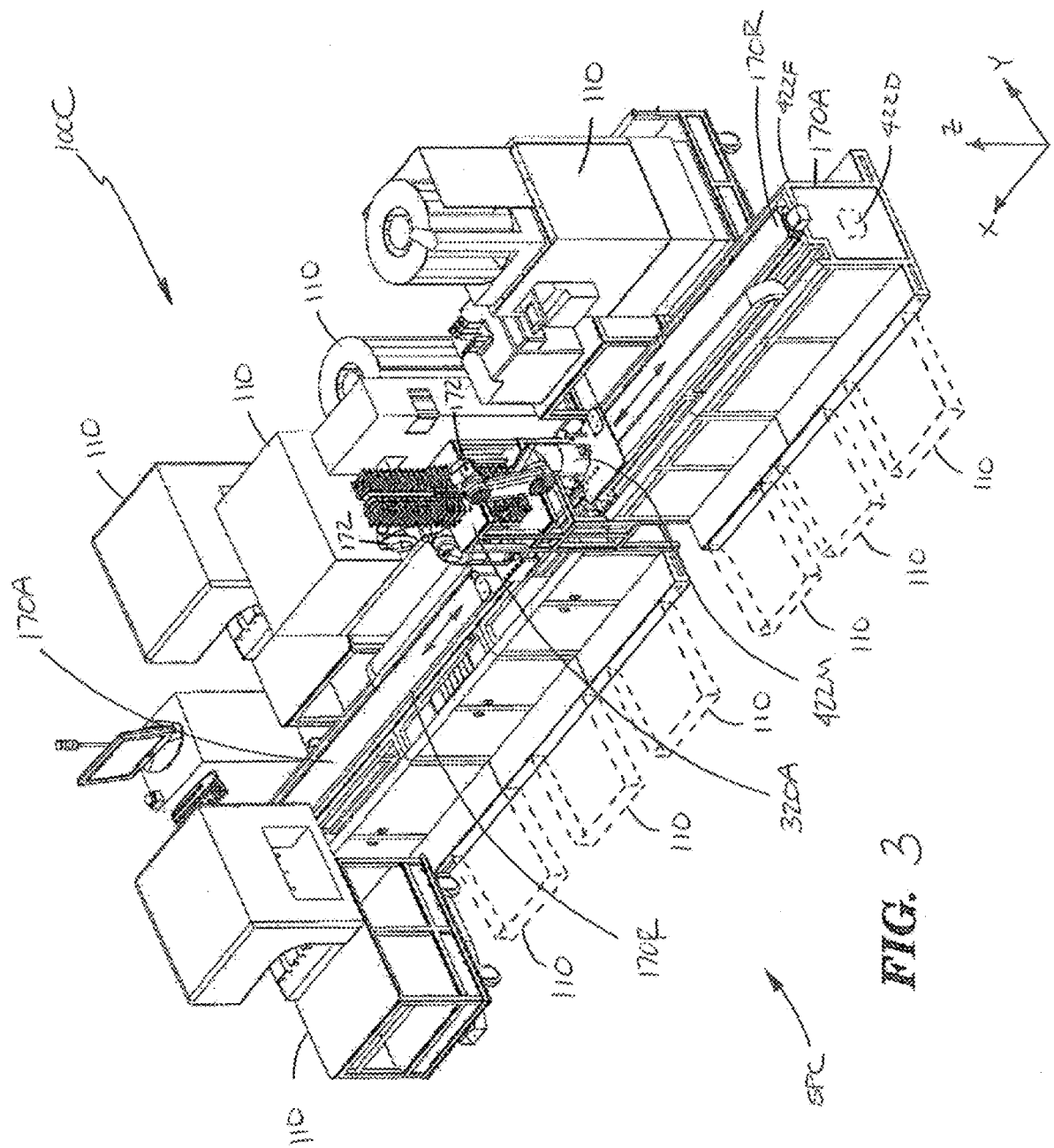
FIG. 3 is a schematic illustration of a robotic processing system in accordance with one or more aspects of the disclosed embodiment.

Referring to FIG. 3, in one aspect, the robotic processing system 100C may be in the form of a linear system as described in U.S. Pat. Nos. 7,560,071, 8,734,720, and 8,795,593, the disclosures of which have been previously incorporated herein by reference. For example, the automated system 170A (which is substantially similar to automated system 170 described above) in this aspect, has a linear arrangement where the robotic transport arm 172 traverses linearly along rail 170R for accessing mobile carts 110 arranged (in a manner substantially similar to that described above) along opposite sides of the automated system 170A. As described above, any suitable interface station 320A may be provided to interface more than one automated system 170A to each other. In one aspect, each of the mobile carts 110, 110A-110F and the automated system 170, 170A include any suitable control system(s) 480A, 480B (similar to control system 480 described herein) that is configured to carry out any suitable operation of the respective mobile cart 110, 110A-110F and automated system 170, 170A. In one aspect, the control systems 480A of the mobile carts 110, 110A-110F may be configured to communicate with the control system 480B of the automated system 170, 170A for coordinating operations between the mobile carts 110, 110A-110F and the automated system 170, 170A. In other aspects, the control system of the automated system 170, 170A may be configured to control operations of the automated carts 110, 110A-10F connected to the automated system 170, 170A.

Figure 4:
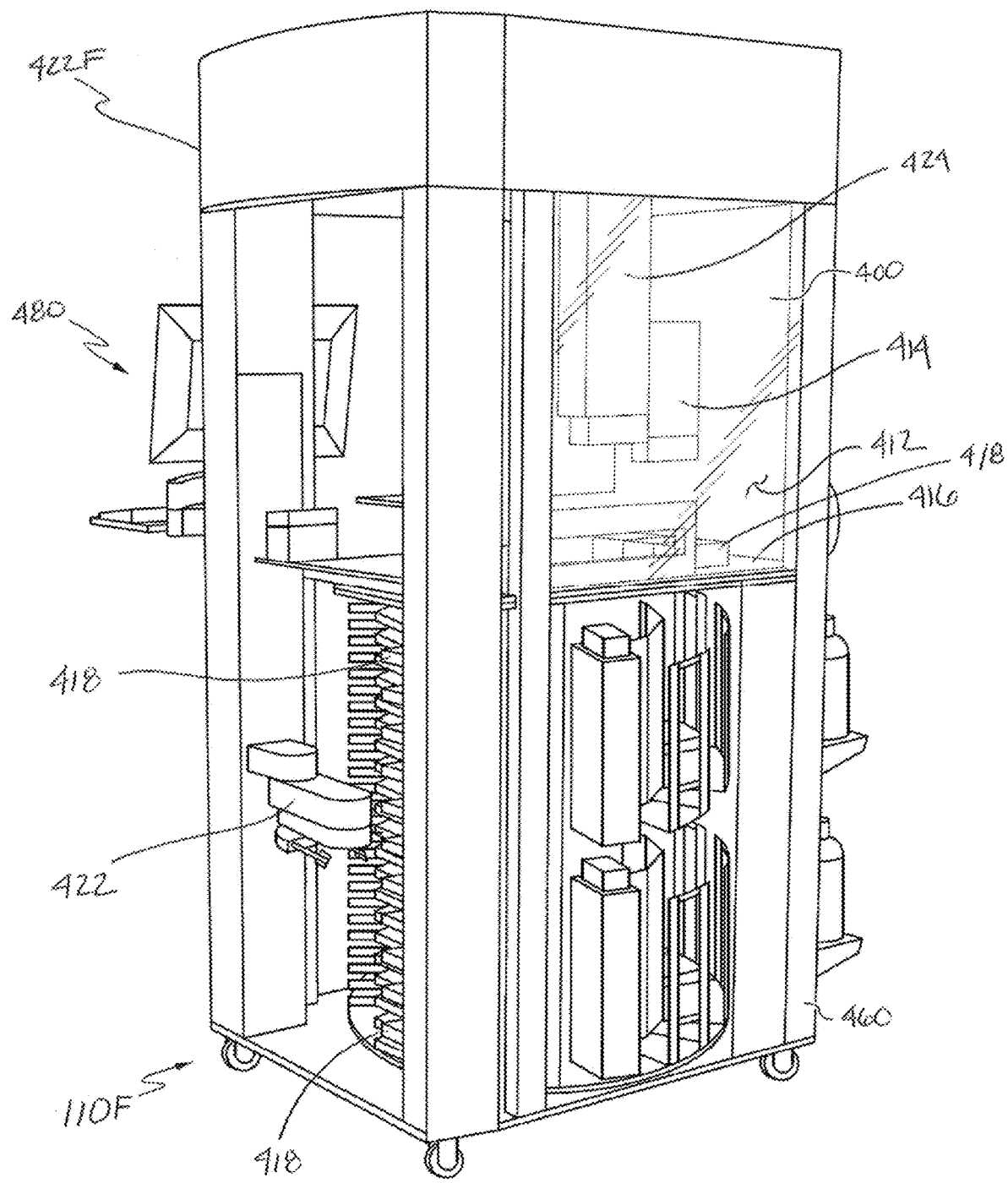
FIG. 4 is a schematic illustration of a robotic processing system in accordance with one or more aspects of the disclosed embodiment.

Referring now to FIG. 4, the robotic processing system 100, 100A, 100B, 100C may include a mobile cart 110F that is substantially similar to that described in U.S. Pat. No. 9,623,405, the disclosure of which is incorporated by reference herein in its entirety. For example, the mobile cart 110F may include a pipetting chamber 400, a storage chamber 460 coupled with the pipetting chamber 400, and a control system 480 (which may be any suitable control system having a processor configured to carry out any suitable operations of the robotic processing system 100D). While the pipetting chamber 400 and storage chamber 460 are shown as being included in a common housing or frame 422F (which forms part the collaborative operating space SPC in which the components of the mobile cart 110F operate and interface with other mobile carts 110, 110A-110E and automated system 170, 170A) in other aspects, the pipetting chamber 400 may be separated from the storage chamber 460, such that the pipetting chamber 400 can act as an independent pipetting chamber. In one aspect, the pipetting chamber 400 may be accessible through one or more doors 412, where the pipetting chamber 400 is sealed from an ambient environment when the one or more doors 412 are closed. The storage chamber 460 may also be similarly sealed from the ambient environment by one or more doors 412.

In one aspect, the pipetting chamber 400 may include a set of pipettor cartridges 414 docked in the pipetting chamber 400 at any suitable dock location of the pipetting chamber 400. The pipetting chamber 400 may also include at least one tray dock 416 for holding pipetting trays 418. The pipetting chamber 400 may include any suitable carrier 424 that is configured to transport each of the pipettor cartridges 414 to a pipetting location, e.g. a location of at least one of the pipetting trays 418 within a tray dock 416 in the pipetting chamber 400. In one aspect, the carrier 424 is a gantry system while in other aspects the carrier may be any suitable transport such as an articulated robotic transport arm. The mobile cart 110G may also include any suitable robotic transport arm 422 (which is substantially similar to one or more of robotic transport arm 120, 422, 172) configured to move pipetting trays 418 between the pipetting chamber 400 and a storage carousel 449 of the storage chamber 416.

Referring to FIG. 5 another exemplary mobile cart 110, which may be substantially similar to one or more of mobile carts 110A-110E, is illustrated. In one aspect, the mobile cart 110 includes a frame 422F that forms a part of a collaborative operating space SPC (see FIGS. 1A-3) in which a pipetting tray storage, such as storage carousel 449, any suitable robotic transport arm 422 and one or more processing stations 500-504 are located. The robotic transport arm 422 is configured to transport the pipetting trays 418 between the storage carousel 449, the processing stations 501-504 and/or the automated system 170, 170A. In other aspects, the robotic transport arm 172 of the automated system 170, 170A may be configured to transport pipetting trays 418 between any one of the processing stations 501-504, the storage carousel 449 and/or robotic transport arm 422 and any other mobile cart 110 connected to the automated system 170, 170A.

Figure 5A:
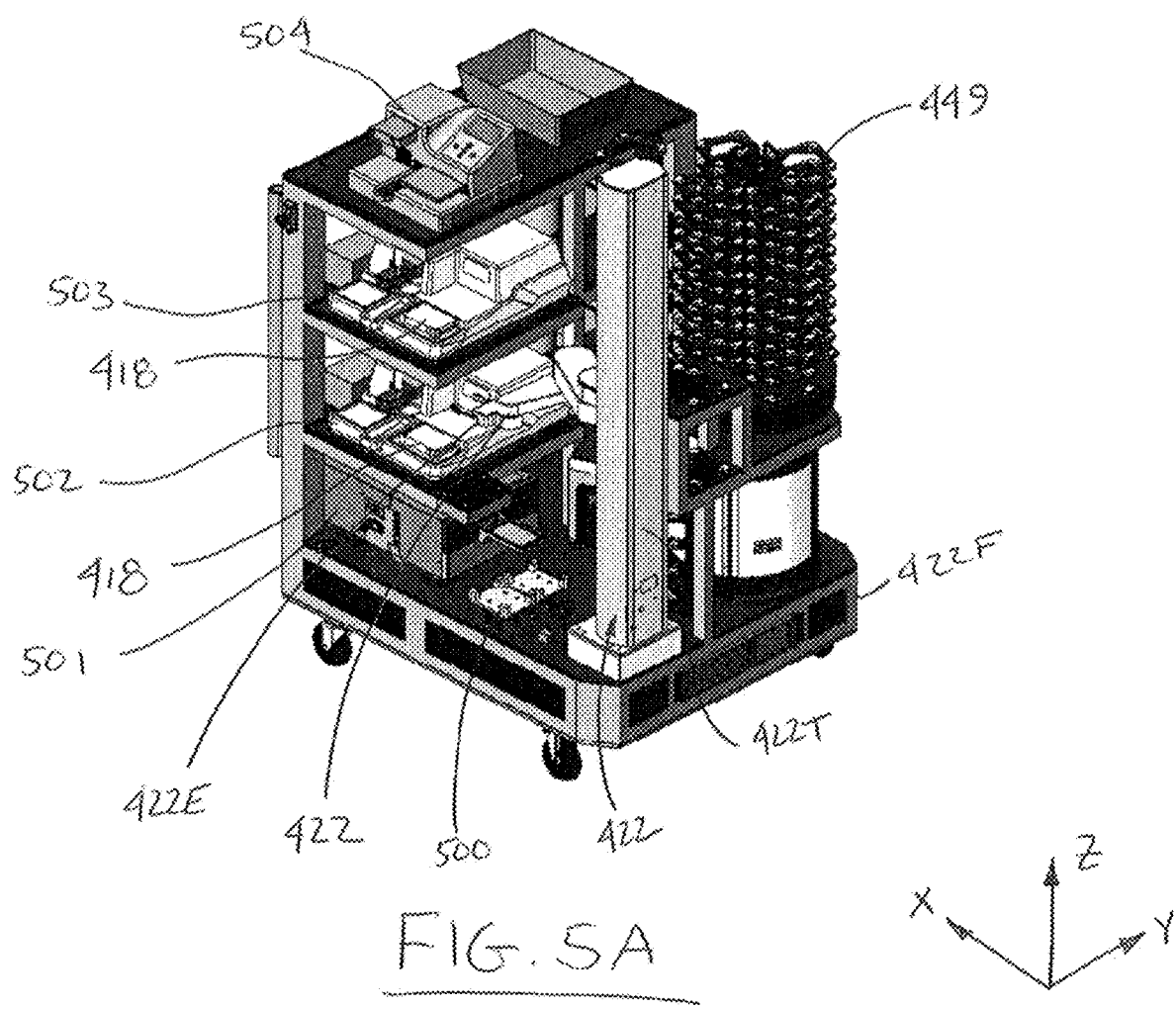

Referring to FIGS. 5A-6, in one aspect, the robotic transport arm 422 includes one or more arm links 422A, 422B and end effector 422E. In one aspect, the robotic transport arm 422 includes a carriage 422M that is movably mounted to a Z axis track 422T for movement along the Z axis. The robotic transport arm 422 includes any suitable drive section 422D that is connected to a frame 422F of the robotic transport arm 422, where the drive section 422D is configured to move the robotic transport arm 422 in the manner described herein. For example, the robotic transport arm 422 may be coupled to the drive section 422D so that the drive section 422D provides the robotic transport arm 422 with robot motion in at least one axis moving at least a portion of the robotic transport arm 422 in a collaborative operating space SPC, corresponding to the frame 422F, from a first location to another different location of at least the portion of the collaborative operating space SPC. In one aspect, such as with robotic transport arm 172, the carriage 422M may be configured to rotate about a rotation axis AX of the robotic transport arm 172 (and may also be movable in the Z axis) as illustrated in FIG. 1A, while in other aspects, the carriage 422M is mounted for movement along the X or Y axes (and may also be movable in the Z axis) as shown in FIG. 3. A first end of arm link 422A is rotatably coupled to the carriage 422M about axis BX. A first end of arm link 422B is rotatably coupled to the second end of arm link 422A about axis CX. The end effector 422E is rotatably coupled to the second end of arm link 422B about axis DX. While two arm links 422A, 422B and end effector 422E are illustrated as being serially coupled to one another in other aspects the robotic transport arm 422 may include more than two arm links and more than one end effector.

The robotic transport arm 422 is configured to move the end effector 422E, under the control of any suitable controller (such as those described herein), in a theta θ direction about, for example, axis BX and in a radial direction R (in other aspects Cartesian coordinates may be used where the end effector is moved in the X and/or Y directions in a manner comparable to movement in the radial direction R). Referring still to FIG. 6, the end effector 422E includes/is provided with a base portion 600 and workpiece grip 610 having workpiece engagement members 611, 612 (FIG. 11, Block 1100) that are configured to engage and hold a workpiece, such as pipetting trays 418, during workpiece transport, such as by the robotic transport arm motion in at least one axis of motion. In one aspect, the workpiece engagement members 611, 612 are movably coupled to the base portion 600 so that at least one of the workpiece engagement members 611, 612 is movable, through activation of the drive section 422D, in direction 699 relative to each other and/or the base portion 600 for effecting the gripping and release of the workpiece while (e.g. the workpiece engagement members 611, 612 are active gripping members) while, in other aspects, the workpiece engagement members 611, 612 may be stationarily coupled to the base portion 600 for passively engaging the workpiece without relative movement between each other and/or the base portion 600 (e.g. the workpiece engagement members 611, 612 are passive griping members). In this aspect, one or more of the workpiece engagement members 611, 612 is configured for linear translation in direction 699 but it should be understood that in other aspects the workpiece engagement members 611, 612 may be moved in any suitable manner relative to each other and/or the base portion 600B for gripping and releasing the workpiece. For example, the workpiece engagement members 611, 612 may be rotatably mounted to the base portion 600B for gripping and releasing the workpiece through a rotation of one or more of the workpiece engagement members 611, 612.

Figure 11:
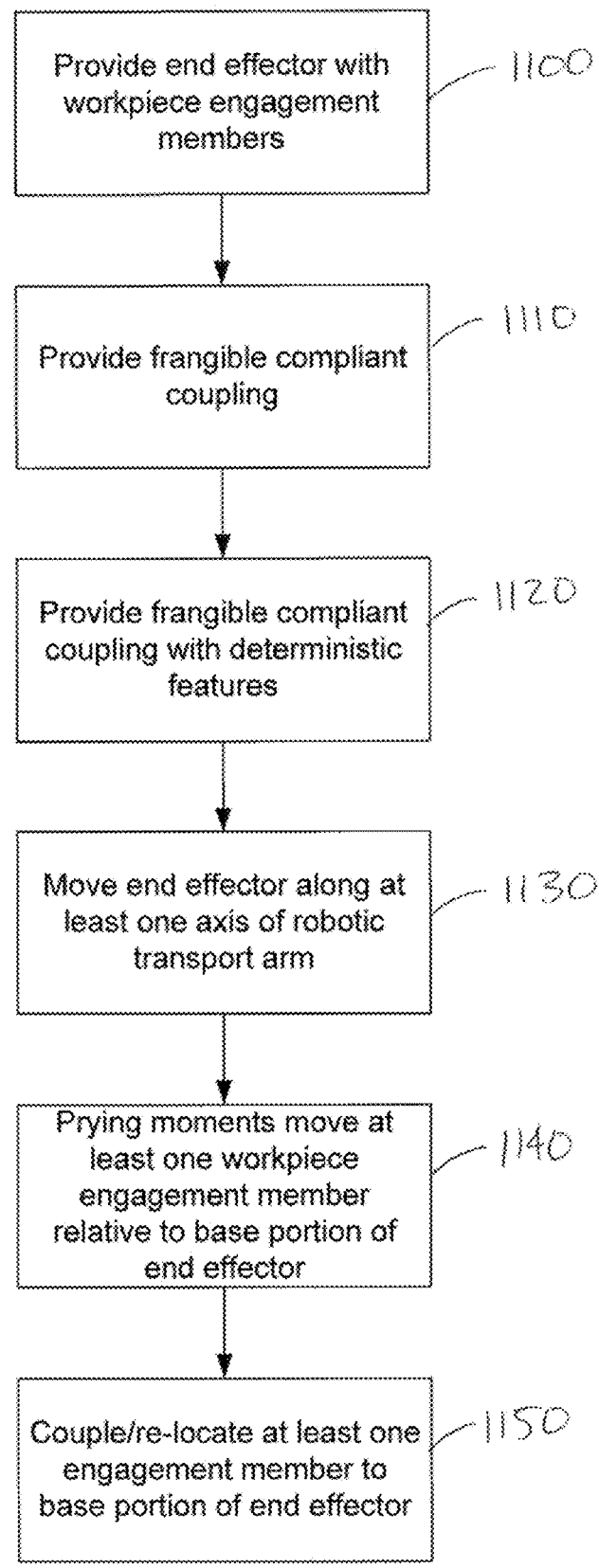
FIG. 11 is a flow diagram in accordance with one or more aspects of the disclosed embodiment.

At least one of the workpiece engagement members 611, 612 is coupled to the base portion 600 so that the workpiece engagement member 611, 612 is frangibly compliant. For example, at least one of the workpiece engagement members 611, 612 is coupled to the base portion 600 by a frangible compliant coupling 620 that is located between a distal portion 611DP, 612DP of the workpiece engagement member 611, 612 and the base portion 600 of the end effector 422E from which the at least one workpiece engagement member 611, 612 depends (FIG. 11, Block 1110). The frangible compliant coupling 620 is configured to remain rigid until frangible yielding reaction in a snap on engagement interface (described below) of the frangible compliant coupling 620 breaks away (with resultant break away of the workpiece engagement member 611, 612 from the base portion 600 of the end effector 422E) at a predetermined force threshold, such as specified in e.g. the American National Standards Institute (ANSI) R 15.06 standards, the International Organization for Standardization (ISO) 10218-1 standards and/or the ISO/TS-15066 standards, all of which standards are incorporated herein by reference in their entireties. As will be described herein at the predetermined force threshold the at least one workpiece engagement member 611, 612 breaks away from the base portion 600 of the end effector 422E. In one aspect, the yield point/force required to break the workpiece engagement member 611, 612 from the base portion 600 of the end effector 600 may depend on the manner in which the workpiece engagement member 611, 612 is coupled to the base portion 600. In one aspect, the frangible compliant coupling 620 is configured to provide about a 2 pound holding force for gripping workpieces (such as, for example, gripping workpieces that have a mass of about 200 grams) where the yield force required to separate each of the workpiece engagement members 611, 612 from the respective base member 701 is suitable for a collaborative operating space SPC and may be in the range from about 5 Newtons to about 10 Newtons. In other aspects, the holding force provided by the frangible compliant coupling may be greater or less than about 2 pounds and the yield force may be greater than about 10 Newtons or less than about 5 Newtons.

The frangible compliant coupling 620 is also configured to align the workpiece engagement member 611, 612 with the base portion 600, a coordinate system of the robotic transport arm and/or a coordinate system of the robotic processing systems described herein. As may be realized, since at least one of the workpiece engagement members 611, 612 is frangibly coupled to the base portion 600 the positioning of the at least one workpiece engagement member 611, 612 is controlled, as described herein, to ensure that the robotic transport arm 120, 172, 422 consistently grip the workpiece in a predetermined position.

Figure 7A:
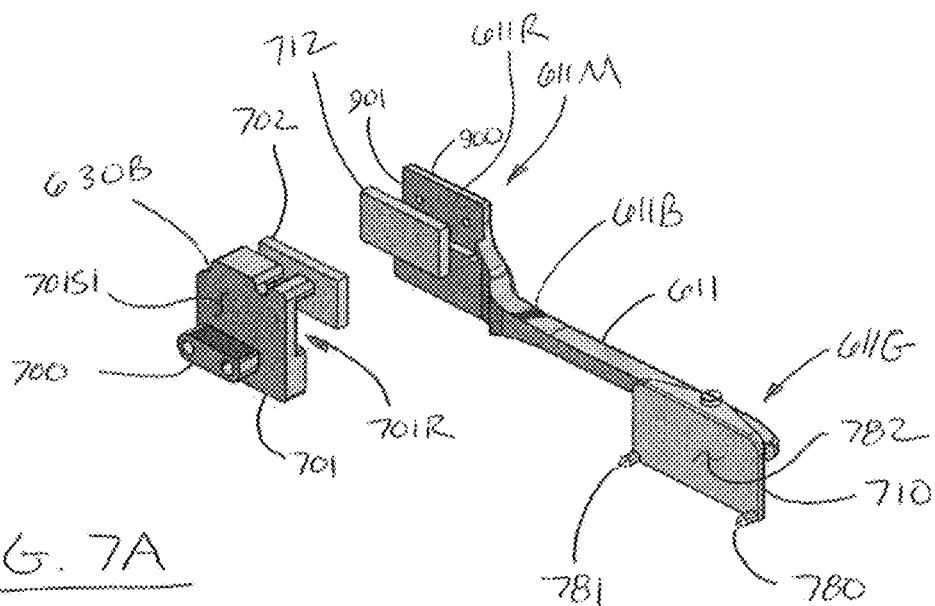
FIGS. 7A, 7B and 7C are schematic illustrations of a portion of an end effector of a robotic processing system in accordance with one or more aspects of the disclosed embodiment.
Figure 7B:
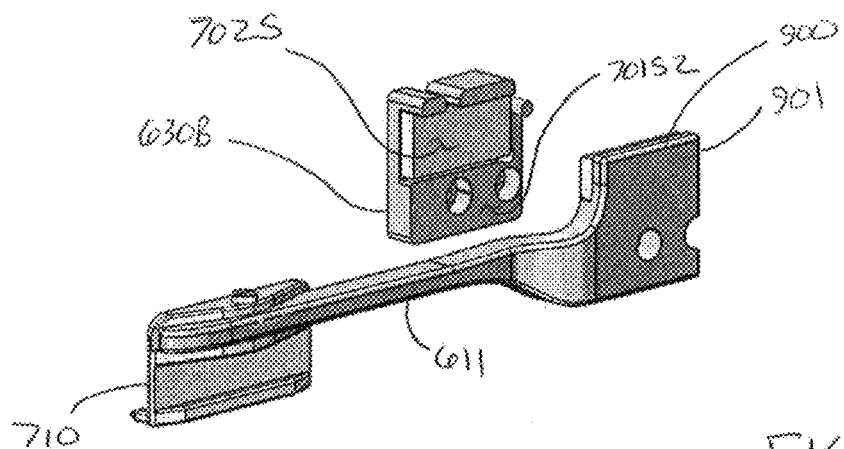
Figure 7C:
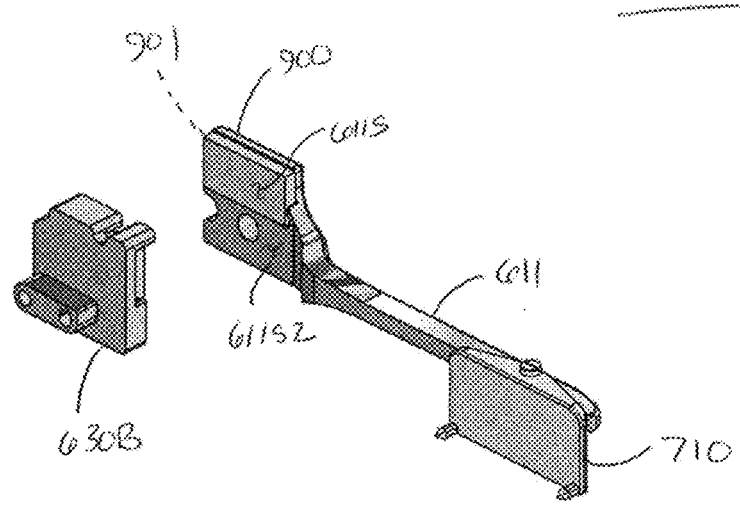
Figure 8:
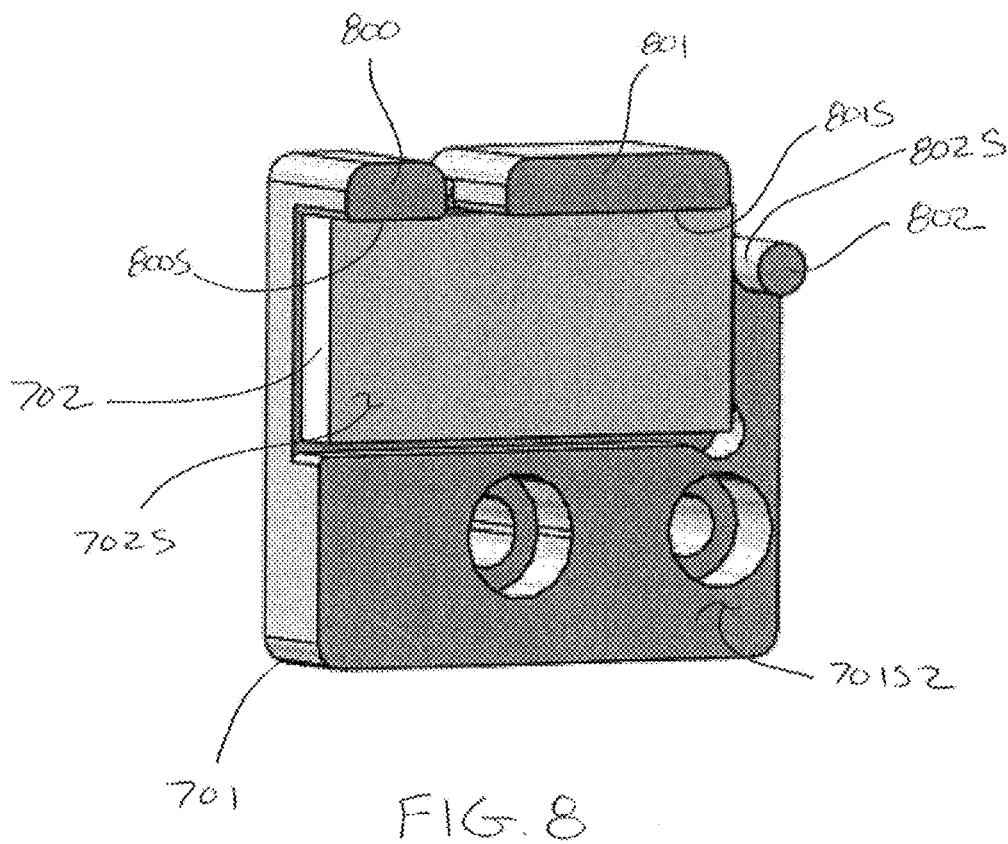
FIG. 8 is a schematic illustration of a portion of an end effector of a robotic processing system in accordance with one or more aspects of the disclosed embodiment.

Referring to FIGS. 6 and 7A-7C the frangible compliant coupling 620 includes a base portion mounting member 630A, 630B and a grip interface portion 640A, 640B that are coupled to each other by a magnetic coupling. In other aspects, any suitable coupling may be provided between the base portion mounting member 630A, 630B and the grip interface portion 640A, 640B such as, for example, with shear pins, shear locations and adhesives. In one aspect, base portion mounting member 630A, 630B of the frangible compliant coupling 620 includes/is provided with deterministic features, as described herein, that define a snap on engagement interface mating with complementing features of the workpiece engagement member 611, 612 (FIG. 11, Block 1120) (where a snap on reattachment is provided as an automatic coupling interface engagement where the coupling interface engagement and alignment of the workpiece engagement member 611, 612 is performed in substantially one step). For example, as described above, where the workpiece engagement members 611, 612 are movable relative to the base portion 600, the base portion mounting member 630A, 630B may be movably mounted to the base portion 600. Where the workpiece engagement members 611, 612 are stationary relative to the base portion 600, the base portion mounting member 630A, 630B may be stationarily mounted to the base portion 600. The base portion mounting member 630A, 630B (it is noted that base portion mounting member 630B and workpiece engagement member 611 are illustrated in FIGS. 7A-7C however, base portion mounting member 630A and workpiece engagement member 612 are similarly configured) includes base member 701 and a magnetic member 702 coupled to the base member 701. In one aspect, the base member 701 includes a boss or alignment portion 700 that extends from a side surface 701S1 of the base member 701 opposite a side surface 701S2 of the base member 701 that the workpiece engagement member is coupled to. The boss 700 is configured to interface with a corresponding recess of the base portion 600 so that the base member 701 is located in a predetermined position/orientation relative to base portion 600 of the end effector 422E. In other aspects, alignment between the base member 701 and the base portion 600 of the end effector may be effected in any suitable manner, such as with alignment pins, shoulder bots, interfacing between one or more surfaces, etc. In one aspect, any suitable shims may be placed between the base member 701 and the base portion 600 of the end effector 422E for aligning/positioning the base member 701 relative to the base portion 600. The base member 701 may be coupled to the base portion in any suitable manner such as with mechanical fasteners.

The base member 701 also includes a recess 701R in which the magnetic member 702 is disposed. The magnetic member 702 may be coupled to the base member 701 within the recess 701R in any suitable manner such as which mechanical or chemical fasteners or through a press or interference fit. In one aspect, a surface 702S of the magnetic member 702 forms a substantially continuous surface with the surface 701S2 of the base member 701 so that a substantially flat interface surface is provided for coupling with the workpiece engagement member 611. In one aspect, the base member 701 may be constructed of a magnetic material, such as for example, magnetic stainless steel or any other suitable magnetic material. In one aspect, the base member 701 includes one or more datum features that are configured to, when the workpiece engagement member 611 is coupled to the base member 701, align the workpiece engagement member 611 in a predetermined orientation relative to the base portion 600 of the end effector 422E and/or a predetermined reference datum of the robotic transport arm so that a location and orientation of at least a gripper 710 of the workpiece engagement member 611 is known in, for example, the transport robot coordinate system (e.g. R, θ shown in FIG. 5B and/or X, Y, Z shown in FIG. 5A).

The workpiece engagement member 611, 612 includes an elongated body 611B having a mounting portion 611M and a gripping portion 611G. The datum surfaces 611S, 611S2, 900, 901 are disposed at and formed by at least the mounting portion 611M of the workpiece engagement member 611, 612. The mounting portion 611M may have any suitable shape and configuration, such as a shape and configuration that is complimentary to or corresponds with the base member 701. The mounting portion 611M may include a recess 611R that receives a magnetic member 712 in a manner substantially similar to that described above with respect to magnetic member 702 and recess 701R where a surface 611S of the magnetic member 712 and a surface 611S2 of the mounting portion 611M for a substantially flat interface surface that interfaces with the substantially flat interface surface formed by surfaces 702S, 701S2. In another aspect, the magnetic member 712 may be sized and shaped to provide a surface 611S that corresponds to the substantially flat surface formed by the surfaces 702S, 701S2 (where, e.g. the magnetic member 712 is about twice the size of the magnetic member 702—in other aspects the magnetic members 702, 712 may have any suitable size relation). In one aspect, the workpiece engagement member 611, 612 may be constructed of any suitable magnetic material in a manner similar to that described above with respect to the base member 701. Here the magnetic member 712 is configured to mate or couple with magnetic member 702 to provide the gripping and yield forces described above. The gripper 710, which is located at the gripping portion 611G of the workpiece engagement member 611, 612 is configured to mate with the workpiece in any suitable manner for transporting the workpiece.

In one aspect, the frangible compliant coupling 620 provides the workpiece engagement member 611, 612 with deterministic features that repeatably position the workpiece engagement member 611, 612 with respect to predetermined reference datum (such as axis AX, BX or a transport plane of the workpiece) of the robotic transport arm 120, 172, 442.

In one aspect, the predetermined reference datum is aligned with a workpiece transport plane TP (see FIG. 5C) defined in part by at least one axis of motion R, θ, X, Y, Z of the robotic transport arm 120, 172, 422. In one aspect the base member 701 includes datum features 801-802 that each have surfaces 800S-802S that interface with corresponding datum surfaces 900, 901 of the workpiece engagement member 611 for aligning the workpiece engagement member 611, 612 with the base portion 600, a coordinate system of the robotic transport arm and/or a coordinate system of the robotic processing systems. In other aspects, alignment of the workpiece engagement member 611 may be provided in any suitable manner such as with shear pins, reference edges, detent devices and removable fixtures. In this aspect, one or more of the surfaces 800S, 801S of the base member 701 are configured to interface with datum surface 900 of the workpiece engagement member 611, 612 for aligning the workpiece engagement member 611, 612 along a first axis (such as e.g. the Z axis) while the surface 802S interfaces with the datum surface 901 of the workpiece engagement member 611, 612 for aligning the workpiece engagement member 611, 612 along a second axis (e.g. the R axis or one of the X or Y axes). In one aspect, the surfaces 800S, 801S are magnetic surfaces that, with the magnetic member 702, hold the workpiece engagement member 611, 612 to the base member 701. The workpiece engagement member 611, 612 also includes a datum surface(s) 611S, 611S2 that interfaces with the surface(s) 702S, 701S2 for aligning the workpiece engagement member 611, 612 along a third axis (e.g. the θ axis or the other one of the X or Y axes).

In one aspect, the datum surface 802S may be a cylindrical or other curved surface to provide a point contact between the workpiece engagement member 611 and the base member 701. As described herein the point contact provided by the datum surface 802S may cause rotation of the workpiece engagement member 611 about datum feature 802 when a force is applied to the workpiece engagement member in a predetermined direction, such as direction 1000 (see FIG. 10A).

Figure 9A:
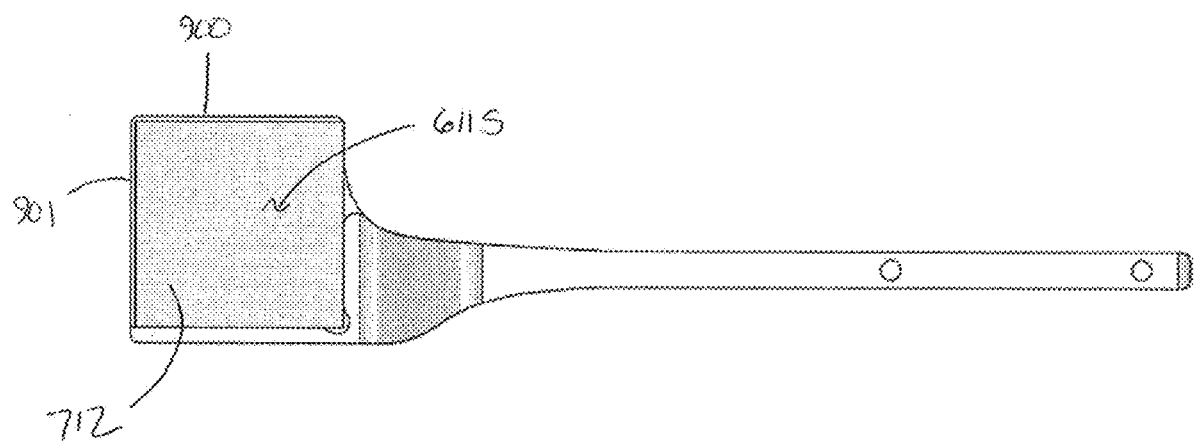
FIGS. 9A and 9B are schematic illustrations of a portion of an end effector of a robotic processing system in accordance with one or more aspects of the disclosed embodiment.
Figure 9B:
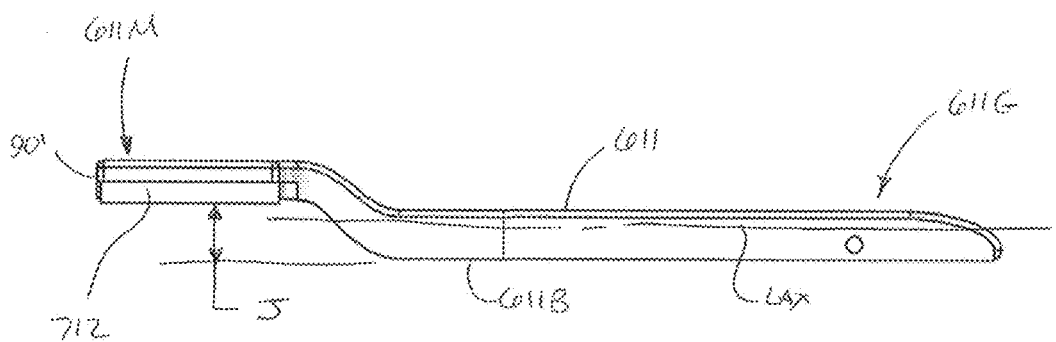
Figure 10A:
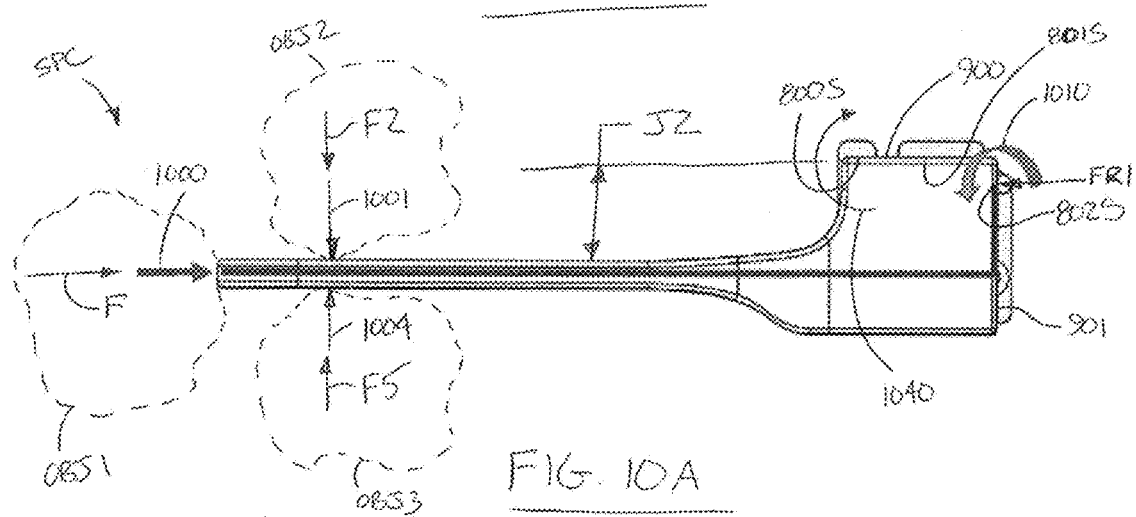
FIGS. 10A and 10B are schematic illustrations of a portion of an end effector of a robotic processing system in accordance with one or more aspects of the disclosed embodiment.
Figure 10B:
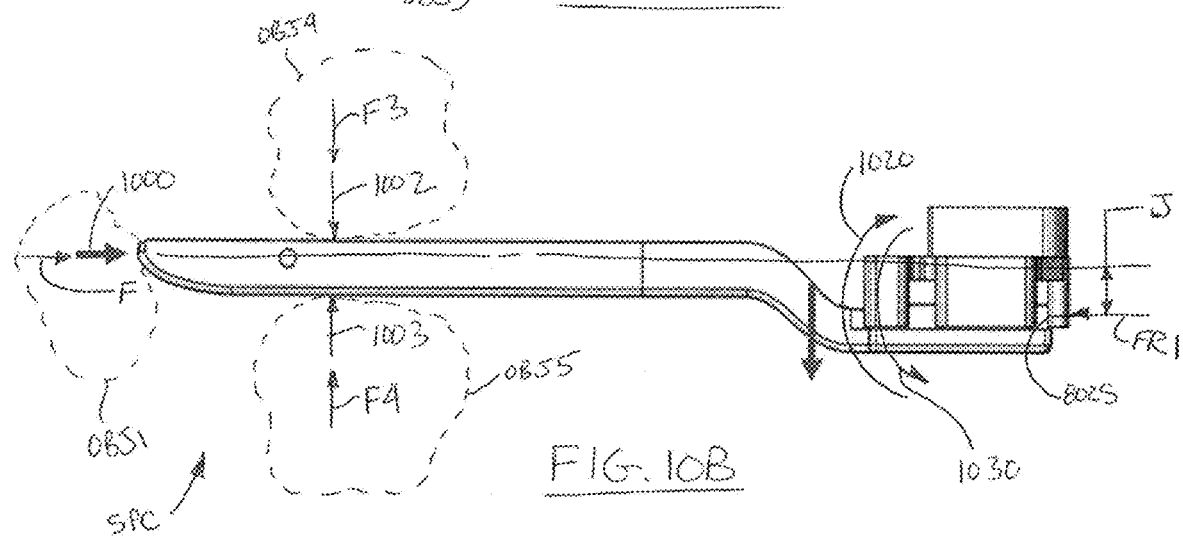

Referring also to FIG. 9B the workpiece engagement member 611, 612 has a shape that, in cooperation with the complementing engagement features between the workpiece engagement member 611, 612 and base member 701 of the frangible compliant coupling 620, induces prying moments on the workpiece engagement member 611, 612 relative to the base member 701. For example, the mounting portion 611M may be laterally offset from the gripping portion 611G by any suitable distance J (where the longitudinal axis LAX extends along a length of the body 611B). While the gripping portion 611G is shown laterally offset to the side of the workpiece engagement member 611 on which the magnetic member 712 is located in other aspects, the gripping portion 611G may be laterally offset to a side of the workpiece engagement member 611 that is opposite the magnetic member 712. Referring also to FIGS. 10A and 10B the gripping portion 611G may also be spaced a predetermined distance J2 from the datum surface 900 so that, when coupled to the base member 701 the gripping portion 611G is offset from the datum surface 802S. In other aspects, the workpiece engagement member 611, 612 has any suitable shape and/or configuration that induces prying moments on the workpiece engagement member 611, 612 relative to the base member 701. For example, as will be described in greater detail below, with brief reference to FIGS. 10A and 10B, a force F applied to the workpiece engagement member 611, 612 produces a reactionary force FR1 at, at least, the surface 802S of the datum feature 802 where the force F and the reactionary force FR1 are offset by the distance J and produce the prying moment 1020 as seen in FIG. 10B. Similarly, as seen in FIG. 10A, the force F and the reactionary force FR1 at the surface 802S are also offset by distance J2 and produce prying moment 1040.

In one aspect, the frangible compliant coupling 620 between each workpiece engagement member 611, 612 and the end effector 422E provides frangible compliance so that the workpiece engagement member 611, 612 breaks away from the end effector 422E during unintended contact between the workpiece engagement member 611, 612 and an obstruction in arm motion in the at least one axis R, θ, X, Y, Z of the robotic transport arm 120, 172, 422. As will be described below, in one aspect, the workpiece engagement member 611, 612 breaks away from unintended contact with obstruction in arm motion in each axis R, θ, X, Y, Z of the at least one axis of motion of the robotic transport arm 120, 172, 422. In one aspect, the workpiece engagement 611, 612 member is configured so that the workpiece engagement member 611, 612 breaks away from the end effector 422E at the frangible compliant coupling 620 from unintended contact with obstruction in arm motion in each axis R, θ, X, Y, Z of the at least one axis of motion of the robotic transport arm 120, 172, 422.

Referring to FIGS. 7A-10B, in operation, where the robotic transport arm 120, 172, 422 is moved along the R axis (or one of the X or Y axes corresponding to the R axis) (FIG. 11 Block 1130) so that the workpiece engagement member 611, 612 contacts an unintended object OBJ1-OBJ5 (see FIGS. 10A and 10B) within the collaborative operating space SPC and a force F is exerted on the workpiece engagement member 611, 612 in the direction 1000, the offsets distances J, J2 in the body 611B of the workpiece engagement member 611, 612 cause prying moments acting on the workpiece engagement member 611, 612 (FIG. 11 Block 1140). For example, force F in direction 1000 acts on the workpiece engagement member 611, 612 to cause rotation of the workpiece engagement member 611, 612 about surface 802S in direction 1010 (where the distance J2 is the moment arm) so that surface 900 is pried away from surface(s) 800S, 801S and surface 611S (and surface 611S2) slides or is moved relative to surface(s) 702S, 701S2 and in one aspect, the workpiece engagement member 611, 612 separates from a respective base member 701 (and hence from the end effector 422E). As may be realized, the surfaces 800S, 801S, 802S, 611S, 611S2, 702S, 701S2 form a frangible interface. Also, the force F in direction 1000 acts on the workpiece engagement member 611, 612 to cause rotation of the workpiece engagement member 611, 612 in direction 1020 about surface 802S (where the distance J is the moment arm) so that surface 611S (and surface 611S2) is pried away from surface(s) 702S, 701S2 and surface 900 slides or is moved relative to surface(s) 800S, 801S and in one aspect, the workpiece engagement member 611, 612 separates from a respective base member 701 (and hence from the end effector 422E).

Where the robotic transport arm 120, 172, 422 is moved along the Z axis (FIG. 11, Block 1130) so that the workpiece engagement member 611, 612 contacts an unintended object OBJ1-OBJ5 within the collaborative operating space SPC and a force F2 is exerted on the workpiece engagement member 611, 612 in the direction 1001, the workpiece engagement member 611, 612 is rotated in direction 1010 about surface 802S so that surface 900 is pried away from surface(s) 800S, 801S and surface 611S (and surface 611S2) slides or is moved relative to surface(s) 702S, 70152 and in one aspect, the workpiece engagement member 611, 612 separates from a respective base member 701 (and hence from the end effector 422E) (FIG. 11, Block 1140). Where the robotic transport arm 120, 172, 422 is moved along the Z axis so that the workpiece engagement member 611, 612 contacts an unintended object OBJ1-OBJ5 within the collaborative operating space SPC and a force F5 is exerted on the workpiece engagement member 611, 612 in the direction 1004, the workpiece engagement member 611, 612 is rotated in direction 1040 about an edge of surface 800S so that surface 900 is pried away from surface(s) 800S, 801S and surface 611S (and surface 611S2) slides or is moved relative to surface(s) 702S, 701S2 and in one aspect, the workpiece engagement member 611, 612 separates from a respective base member 701 (and hence from the end effector 422E). Here the surface 901 may also slide or move relative to the surface 802S during rotation of the workpiece engagement member 611, 612 in direction 1040.

Where the robotic transport arm 120, 172, 422 is moved along the θ axis (or one of the X or Y axes) (FIG. 11 Block 1130) so that the workpiece engagement member 611, 612 contacts an unintended object OBJ1-OBJ5 within the collaborative operating space SPC and a force F3 is exerted on the workpiece engagement member 611, 612 in the direction 1002, the workpiece engagement member 611, 612 is rotated in direction 1030 about surfaces 802S and 702S (and 701S2) so that surface 900 slides or moves relative to surface(s) 800S, 801S and surface 611S (and surface 611S2) is pried away from surface(s) 702S, 701S2 and in one aspect, the workpiece engagement member 611, 612 separates from a respective base member 701 (and hence from the end effector 422E) (FIG. 11 Block 1140). Where the robotic transport arm 120, 172, 422 is moved along the θ axis (or one of the X or Y axes) so that the workpiece engagement member 611, 612 contacts an unintended object OBJ1-OBJ5 within the collaborative operating space SPC and a force F4 is exerted on the workpiece engagement member 611, 612 in the direction 1003, the workpiece engagement member 611, 612 is rotated in direction 1020 about an edge of surfaces 702S (and 701S2) so that surface 900 slides or moves relative to surface(s) 800S, 801S and surface 611S (and surface 611S2) is pried away from surface(s) 702S, 701S2 and in one aspect, the workpiece engagement member 611, 612 separates from a respective base member 701 (and hence from the end effector 422E).

As may be realized, the robot movements along the R, θ, and Z axes or the X, Y and Z axes may be combined so that the prying moments produced by the forces F, F2-F5 are combined in any suitable manner causing movement of the frangible interface formed by surfaces 800S, 801S, 802S, 611S, 611S2, 702S, 701S2. In one aspect, as described above, the frangible compliant coupling 620 provides for complete separation of the at least one workpiece griping member 611, 612 (it is note that in one aspect both workpiece engagement members are configured with the frangible compliant coupling 620 as illustrated in the figures). The frangible complaint coupling 620 described herein also remains rigid relative to the base portion 600 of the end effector 422E with respect to each axis R, θ, X, Y, Z of motion of the at least one axis of motion of the robotic transport arm 120, 172, 422 until the predetermined yielding force threshold is met. In one aspect, after the at least one of the workpiece engagement members 611, 612 has been moved relative to (e.g. displaced or entirely disconnected) the base portion 600 of the end effector 422E, the at least one workpiece engagement members 611, 612 may be recoupled to the base portion 600 (FIG. 11, Block 1150) such as by the "snap on" type reattachment where the snap on reattachment is an automatic coupling interface engagement where the coupling interface engagement and alignment of the workpiece engagement member 611, 612 is performed in substantially one step. For example, the at least one workpiece engagement members 611, 612 is snapped on a respective base portion mounting member 630A, 630B where the at least one workpiece engagement members 611, 612 are located relative to a predetermined reference datum (as described herein) using the deterministic features (such as surfaces 701S1, 702S, 800S, 801S, 802S) in substantially one step.

In accordance with one or more aspects of the disclosed embodiment a robotic transport system comprises
  a frame;
  a drive section connected to the frame;
  an articulated arm operably coupled to the drive section providing the articulated arm with arm motion in at least one axis of motion moving at least a portion of the articulated arm in a collaborative space, corresponding to the frame, from a first location to another different location of at least the portion of the articulated arm in the collaborative space;
  the articulated arm having an end effector with workpiece grip having workpiece engagement members engaging and holding a workpiece during workpiece transport, by the arm motion in the at least one axis of motion;
  wherein at least one of the workpiece engagement members is a frangible compliant, having a frangible compliant coupling between a distal portion of the at least one of the workpiece engagement members and a base portion of the end effector from which the at least one of the workpiece engagement members depends.

In accordance with one or more aspects of the disclosed embodiment the at least one of the workpiece engagement members is frangible compliant so that the at least one of the workpiece engagement members breaks away from the end effector during unintended contact between the at least one of the workpiece engagement members and an obstruction in the arm motion in the at least one axis of motion of the articulated arm.

In accordance with one or more aspects of the disclosed embodiment the at least one of the workpiece engagement members breaks away from the end effector during unintended contact with an obstruction in each axis of the arm motion in at least one axis of motion of articulated the arm.

In accordance with one or more aspects of the disclosed embodiment the at least one of the workpiece engagement members is frangible compliant so that the at least one of the workpiece engagement members breaks away from the end effector at the frangible compliant coupling during unintended contact with an obstruction in arm motion in each axis of the at least one axis of motion of the articulated arm.

In accordance with one or more aspects of the disclosed embodiment the frangible compliant coupling has as a frangible interface between a coupling portion of the base portion of the end effector and a mating coupling portion of the at least one of the workpiece engagement members.

In accordance with one or more aspects of the disclosed embodiment the frangible compliant coupling is configured so that the at least one of the workpiece engagement members is substantially rigid relative to the base portion of the end effector with respect to each axis of the arm motion in at least one axis of motion of the articulated arm.

In accordance with one or more aspects of the disclosed embodiment the frangible compliant coupling has a workpiece engagement member interface with deterministic features repeatably positioning the at least one of the workpiece engagement members with respect to predetermined reference datum of the articulated arm.

In accordance with one or more aspects of the disclosed embodiment the predetermined reference datum of the articulated arm is aligned with a workpiece transport plane defined in part by the arm motion in at least one axis of motion.

In accordance with one or more aspects of the disclosed embodiment the frangible compliant coupling deterministic features define a snap on engagement interface mating with complementing features of the at least one of the workpiece engagement members.

In accordance with one or more aspects of the disclosed embodiment the at least one of the workpiece engagement members is frangible compliant so that break away from the base portion of the end effector complies with at least one of ANSI R 15.06 standards, ISO 10218-1 standards, or ISO/TS-15066 standards.

In accordance with one or more aspects of the disclosed embodiment a method includes providing a drive section connected to a frame of a robotic transport system, providing an articulated arm having an end effector with a workpiece grip having workpiece engagement members, the articulated arm operably coupled to the drive section providing the articulated arm with robot motion in at least one axis moving at least a portion of the articulated arm in a collaborative space, corresponding to the frame, from a first location to another different location of at least the portion of the articulated arm in the collaborative space, engaging and holding a workpiece with the workpiece engagement members during workpiece transport, by the arm motion in the at least one axis of motion, wherein at least one of the workpiece engagement members is frangible compliant, having a frangible compliant coupling between a distal portion of the at least one of the workpiece engagement members and a base portion of the end effector from which the at least one of the workpiece engagement members depends.

In accordance with one or more aspects of the disclosed embodiment breaking the at least one of the workpiece engagement members away from the end effector during unintended contact between the at least one of the workpiece engagement members and an obstruction in the arm motion in the at least one axis of motion of the articulated arm.

In accordance with one or more aspects of the disclosed embodiment breaking the at least one of the workpiece engagement members away from the end effector during unintended contact with an obstruction in each axis of the arm motion in at least one axis of motion of the articulated arm.

In accordance with one or more aspects of the disclosed embodiment breaking the at least one of the workpiece engagement members away from the end effector at the frangible compliant coupling during unintended contact with an obstruction in each axis of the arm motion in at least one axis of motion of the articulated arm.

In accordance with one or more aspects of the disclosed embodiment the frangible compliant coupling has as a frangible interface between a coupling portion of the base portion of the end effector and a mating coupling portion of the at least one of the workpiece engagement members.

In accordance with one or more aspects of the disclosed embodiment the frangible compliant coupling is configured so that the at least one of the workpiece engagement members is substantially rigid relative to the base portion of the end effector with respect to each axis of the arm motion in at least one axis of motion of the articulated arm.

In accordance with one or more aspects of the disclosed embodiment repeatably positioning the at least one of the workpiece engagement members with respect to predetermined reference datum of the articulated arm with deterministic features of a workpiece engagement member interface of the frangible compliant coupling.

In accordance with one or more aspects of the disclosed embodiment the predetermined reference datum of the articulated arm is aligned with a workpiece transport plane defined in part by the arm motion in at least one axis of motion.

In accordance with one or more aspects of the disclosed embodiment the frangible compliant coupling deterministic features define a snap on engagement interface mating with complementing features of the at least one of the workpiece engagement members.

In accordance with one or more aspects of the disclosed embodiment the at least one of the workpiece engagement members is frangible compliant so that breaking away from the base portion of the end effector complies with at least one of ANSI R 15.06 standards, ISO 10218-1 standards, or ISO/TS-15066 standards.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A robotic transport system comprising:
a frame;
a drive section connected to the frame;
an articulated arm operably coupled to the drive section with arm motion in at least one axis of motion in a collaborative space defined by the frame, the articulated arm being translated from a first location to another different location in the collaborative space;
the articulated arm having an end effector with a workpiece grip extending therefrom, comprising opposing workpiece engagement members engaging and holding a workpiece during workpiece transport;
wherein at least one of the workpiece engagement members comprises is a frangible compliant coupling between a distal portion of the at least one workpiece engagement member and a base portion of the end effector so that the workpiece engagement member breaks away from the end effector during unintended contact between the workpiece engagement member and an obstruction in the arm motion,
wherein the frangible compliant coupling comprises a frangible magnetic interface between a coupling portion of the base portion of the end effector and a mating coupling portion of the workpiece engagement member, and a workpiece engagement member interface with deterministic features repeatably automatically aligning and positioning the workpiece engagement member with respect to predetermined reference datum of the articulated arm.

2. The robotic transport system of claim 1, wherein the at least one of the workpiece engagement members is frangible compliant so that the at least one of the workpiece engagement members breaks away from the end effector at the frangible compliant coupling during unintended contact with an obstruction in arm motion in each axis of the at least one axis of motion of the articulated arm.

3. The robotic transport system of claim 1, wherein the frangible compliant coupling is configured so that the at least one of the workpiece engagement members is substantially rigid relative to the base portion of the end effector with respect to each axis of the arm motion in at least one axis of motion of the articulated arm.

4. The robotic transfer system of claim 1, wherein the predetermined reference datum of the articulated arm is aligned with a workpiece transport plane defined in part by the arm motion in at least one axis of motion.

5. The robotic transfer system of claim 1, wherein the frangible compliant coupling deterministic features define a snap on engagement interface mating with complementing features of the at least one of the workpiece engagement members.

6. A method comprising:
providing a drive section connected to a frame of a robotic transport system;
providing an articulated arm having an end effector with a workpiece grip extending therefrom, comprising opposing workpiece engagement members, the articulated arm operably coupled to the drive section with robot motion in at least one axis in a collaborative space defined by the frame, the articulated arm being translated from a first location to another different location in the collaborative space; and
engaging and holding a workpiece with the workpiece engagement members during workpiece transport;
wherein at least one of the workpiece engagement members comprises a frangible compliant coupling between a distal portion of the at least one workpiece engagement member and a base portion of the end effector so that the workpiece engagement member breaks away from the end effector during unintended contact between the workpiece engagement member and an obstruction in the arm motion,
wherein the frangible compliant coupling comprises a frangible magnetic interface between a coupling portion of the base portion of the end effector and a mating coupling portion of the workpiece engagement member, and a workpiece engagement member interface with deterministic features repeatably automatically aligning and positioning the workpiece engagement member with respect to predetermined reference datum of the articulated arm.

7. The method of claim 6, further comprising breaking the at least one of the workpiece engagement members away from the end effector at the frangible compliant coupling during unintended contact with an obstruction in each axis of the arm motion in at least one axis of motion of the articulated arm.

8. The method of claim 6, wherein the frangible compliant coupling is configured so that the at least one of the workpiece engagement members is substantially rigid relative to the base portion of the end effector with respect to each axis of the arm motion in at least one axis of motion of the articulated arm.

9. The method of claim 6, wherein the predetermined reference datum of the articulated arm is aligned with a workpiece transport plane defined in part by the arm motion in at least one axis of motion.

10. The method of claim 6, wherein the frangible compliant coupling deterministic features define a snap on engagement interface mating with complementing features of the at least one of the workpiece engagement members.

* * * * *